United States Patent
Holley et al.

(10) Patent No.: US 8,515,880 B2
(45) Date of Patent: Aug. 20, 2013

(54) CONDITION MONITORING OF AN UNDERWATER FACILITY

(75) Inventors: Stuart Holley, Bristol (GB); Nicholas Ellson, Bristol (GB)

(73) Assignee: Vetco Gray Controls Limited, Nailsea, Bristol (GB)

( * ) Notice: Subject to any disclaimer, the term of this patent is extended or adjusted under 35 U.S.C. 154(b) by 323 days.

(21) Appl. No.: 12/887,088

(22) Filed: Sep. 21, 2010

(65) Prior Publication Data

US 2011/0071966 A1    Mar. 24, 2011

(51) Int. Cl.
| | |
|---|---|
| G06F 11/30 | (2006.01) |
| G08B 29/18 | (2006.01) |
| B63B 45/04 | (2006.01) |

(52) U.S. Cl.
USPC ................. 706/12; 116/4; 116/26; 116/27

(58) Field of Classification Search
USPC .......................................................... 706/12
See application file for complete search history.

(56) References Cited

U.S. PATENT DOCUMENTS

| | | |
|---|---|---|
| 2005/0007249 A1 | 1/2005 | Eryurek et al. |
| 2009/0044938 A1 | 2/2009 | Crossley et al. |
| 2009/0201170 A1 | 8/2009 | Reckmann et al. |

FOREIGN PATENT DOCUMENTS

| | | | |
|---|---|---|---|
| EP | 0728915 A3 | | 8/1997 |
| GB | 2417738 A | * | 3/2006 |
| GB | 2456300 A | | 7/2009 |
| WO | 2008048110 A1 | | 4/2008 |

OTHER PUBLICATIONS

EP Search Report and Written Opinion dated Mar. 21, 2012 from corresponding EP Application No. 10176656.6.
Search Report May 10, 2010 issued in GB0916421.1.

* cited by examiner

*Primary Examiner* — Jeffrey A Gaffin
*Assistant Examiner* — Nathan Brown, Jr.
(74) *Attorney, Agent, or Firm* — Bracewell & Giuliani LLP (57) ABSTRACT

A method for monitoring the condition of apparatus located at an underwater facility that includes sensing at least one parameter associated with the apparatus, providing a model of expected behavior of said at least one parameter, comparing said sensed parameter with said model, and assessing the condition of the apparatus based upon said comparison.

22 Claims, 3 Drawing Sheets

CONDITION MONITORING OF AN UNDERWATER FACILITY

RELATED APPLICATIONS

This application claim priority to United Kingdom Patent Application No. 0916421.1 filed Sep. 21, 2009.

FIELD OF THE INVENTION

This invention relates to a method for monitoring the condition of apparatus located at an underwater facility and condition monitoring means for monitoring a component of an underwater facility. In particular, the invention is applicable to an underwater facility such as a subsea hydrocarbon production facility.

BACKGROUND OF THE INVENTION

Subsea equipment associated with the production of oil and gas is generally designed with a design life of up to about thirty years. Naturally however, faults and failures still regularly occur within these complex pieces of equipment. Intervention operations to recover failed modules may be extremely costly and the availability of vessels to perform these operations at short notice may be limited. Also, failures within the equipment can be potentially harmful to both the environment and personnel safety.

Types of subsea equipment failure include for example:
breakdown of resistance in electrical conductors' insulation and/or breakdown of the conductors themselves;
leaks within hydraulic and chemical systems;
wear within choke valves;
wear within valve actuators; and
failure of controlling electronics.

A current approach towards detecting such failures is to utilise sensors fitted to subsea equipment to measure various parameters within the electrical/electronic, hydraulic, chemical and production systems. There may be many such sensors deployed subsea. Many of these measurements are monitored via a control system located topside, i.e. at the surface either on land or on a vessel or platform. Currently, parameter monitoring uses statically defined alarm set-points to alert an operator, local to the control system, that an abnormal condition, indicating a fault or failure, is present. By way of simple example, the monitoring system may be set to raise an alarm once a pressure sensor measures a pressure higher than a set, predetermined value. This method has various associated problems. These include:

1. The operators, although familiar with a system's operation, may not be experts in the equipment's behaviour. Consequently, this may affect the reaction time to a problem, as, once an abnormal condition has been detected, the operator may have to contact the supplier of the equipment. This in turn may greatly increase the resolution time and diagnosis of the problem.
2. Due to the nature of statically alarming at low or high set points, the fault condition concerned is often already well-developed by this stage. Therefore scheduling of maintenance, prior to failure of the equipment, may not be feasible.
3. The measurement system does not consider the interaction between components within the fluid production system.
4. The measurement system generally produces a large amount of telemetry data, making it difficult for the operator to understand the health of the system, as some equipment operation is more important than others.
5. Visibility of the status of the system is limited to trained operators and may not be available to a high level user.

SUMMARY

Disclosed herein is a method of modelling the predicted behaviours of sensed parameters associated with facility components, and correlating these with actually sensed values.

Accordingly, the invention enables the remote monitoring of the condition of subsea equipment to provided enhanced feedback and abnormal condition detection. The invention, through modelling of the measured parameters, provides early warning and diagnostic information, to enable preventative actions to be undertaken or maintenance to be scheduled.

The invention may be used with existing subsea installations, using the sensors already present, or alternatively, new installations could be optimised for enabling the invention.

There are various benefits to the present invention. These include:

a) a decrease in downtime in production due to scheduled maintenance;
b) a reduced cost of unplanned interventions;
c) less experienced operators are required to operate the system;
d) faster response times in reacting to situations;
e) better visibility of system performance/status; and
f) the ability to share data with other interested parties.

In accordance with a first aspect of the present invention, there is provided a method for monitoring the condition of apparatus located at an underwater facility, comprising the steps of:

a) sensing at least one parameter associated with the apparatus,
b) providing a model of expected behaviour of said at least one parameter,
c) comparing said sensed parameter with said model, and
d) assessing the condition of the apparatus based upon said comparison.

In accordance with a second aspect of the present invention, there is provided condition monitoring means for monitoring a component of an underwater facility, comprising:

a sensor associated with the component for sensing a parameter and outputting a signal indicative of said parameter;

an expert system arranged to receive each said output signal, the expert system including a model of expected behaviour of said parameter.

BRIEF DESCRIPTION OF THE DRAWINGS

The invention will now be described with reference to the accompanying drawings, in which.

DETAILED DESCRIPTION

Figure 1:
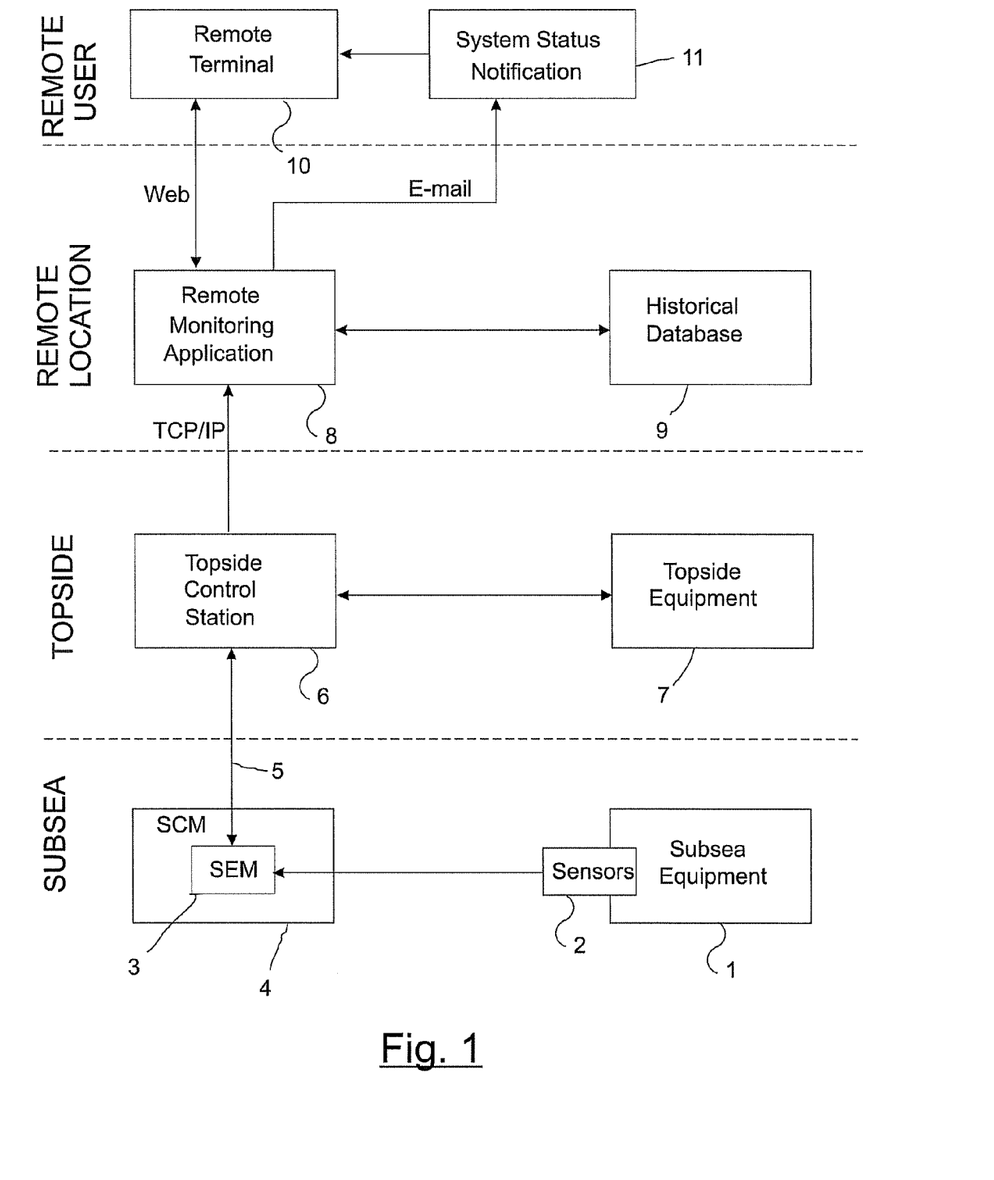
FIG. 1 schematically shows an overview of an exemplary monitoring system in accordance with the present invention.

FIG. 1 schematically shows an overview of an exemplary monitoring system in accordance with the present invention. This system is implemented as an expert system, located remotely from the topside's control system, which interprets data autonomously and provides feedback to an operator on the health of the monitored facility and also provides advice on potential maintenance requirements.

For simplicity, FIG. 1 divides the system into four locations: subsea, topside, remote location and remote user.

a) Subsea

A subsea apparatus component 1, for example, but not limited to, a well tree (or "Christmas tree"), manifold, power generation or storage device, communications or power distribution hub, electronics or control module is located at the seabed. This apparatus component 1 has sensors 2 associated with it. Typically a large number of sensors are provided, so that various parameters may be measured. These may include for example pressure, temperature, flowrate of hydraulic or production fluids, electrical current, component temperature etc, although any sensor output could be incorporated into a system in accordance with the present invention.

In use, data captured by the sensors 2 from subsea apparatus 1, are passed to a subsea electronics module (SEM) 3, which may be located at a well tree or separate to it. The subsea electronics module performs initial processing of the sensor data. Typically, the subsea electronics module will be housed within in a subsea control module (SCM) 4, generally mounted on the well tree.

b) Topside

Located topside, i.e. at the surface, for example on land or on a vessel or platform, are a control station 6 and topside equipment 7 linked thereto. The control station 6 is in communication with subsea via an umbilical cable 5, such that the processed sensor data may be transmitted from the subsea electronics module 3 to the topside control station 6 via the umbilical 5.

The topside control station 6 comprises means for converting the sensor data into a format optimised for transmission, typically using the established TCP/IP protocol, using an interne or satellite link to a remote location.

c) Remote Location

Here, the term "remote location" means a location remote from the subsea equipment. In many cases this location will also be remote from the topside location, for example at a central control base, but may optionally be located at the topside location.

Situated at the remote location is a remote monitoring application 8. This comprising processing means adapted to perform much of the data analysis required by the present invention to determine the health of the subsea apparatus 1. In particular, the remote monitoring application 8 is linked to a historical database 9, which stores historical data and expected behaviour models for processes and components of the subsea apparatus 1. This enables the remote monitoring application 8 to function as a so-called expert system, as will be described in more detail later.

d) Remote User

A remote terminal 10 is provided to enable an end user to view the system status remotely. The terminal 10 may be in communication with the remote monitoring application 8 via a secure web-based interface for example. In addition, a system status notification component 11 is provided, so that the end user may be autonomously notified of abnormal system behaviour both through the remote interface and through the use of email notifications. The notification system can also act as a means of sharing data with third party equipment vendors who may be required to diagnose the state of their equipment.

In addition, remote users may send information to the remote monitoring application 8. In this way, the system may receive feedback and improve its analysis through learning, as mentioned below.

e) Expert System

The expert system preferably comprises both analytical computer models and input from an external source, for example experienced personnel, which may both stored in the historical database 9. Using these components, the system is capable of incorporating feedback and learning from experiences, to enhance the model(s) and the improve the system's operation.

The system collates all of the many individual parameter data from the sensors 2, measuring the data either continuously, or at discrete points in time. Each data condition is assigned a priority rating, which affects the weighting of each data condition in the overall assessment. The prioritisation takes the form of a ranked number system assigned to alarms of certain groupings (see example below), in descending order of importance in terms of its effect on the equipment:

0—Emergency Shutdown (EDS) and safety related systems
    10—Process critical data
    20—Key equipment status
    30—Process support data
    40—Facility support data
    50—Tertiary data Any alarms associated with the parameter data are also collated by the system. These alarms may constitute hard limits, or trending or conditional limits and have the same rating philosophy as applied to the other data above.

The system can then summarise the status of the equipment within the monitored well facility, to provide an overall health score and a simplified view of the subsea system status.

Specific methods by which the expert system of this invention can detect the problems of:

a) breakdown of resistance in electrical conductors;
    b) leaks within hydraulic, chemical systems;
    c) wear/erosion within choke valves;
    d) wear within actuated valves; and
    e) failure of controlling electronics.

are detailed as follows:—

Breakdown of Resistance, Using Example of Umbilical Electrical Conductor Condition Monitoring A typical subsea control system utilises a composite subsea umbilical 5 to transmit from the topside control station 6, electrical power and communication signals subsea, alongside hydraulic and chemical supplies. The subsea end of umbilical 5 terminates in an umbilical termination assembly (UTA) 16 (see FIG. 3). These electrical power signals are transmitted and distributed via insulated conductors terminated within wet-mateable connections to the subsea equipment.

The operation of the electrical distribution system is key to the operability of the subsea system. Typical subsea electrical distribution systems operate at between 150 to 600 volts, but with longer offset distances these voltages increase into the kilovolts range. Breakdowns in the resistance of a conductor's insulation can cause a system failure and potentially harm to operators, or divers, working on the system. Also, conductors within the umbilical or flying leads and the electrical connectors have a tendency to break down over time.

Currently, umbilical resistance is often (but not always) monitored by a line insulation monitor device (LIM) which measures the resistance between one or more electrical conductors and earth. A drawback of this system is that the LIM measurements are monitored in isolation and are used only to trigger alarms at pre-determined set points. Once an umbilical reaches these set points the insulation has generally degraded to such an extent that the electrical line is inoperable. Also, the measurement itself is generally inaccurate and as a stand-alone measurement is of limited use.

The present invention enables the utilisation of the existing telemetry that current condition monitoring systems already provide from sensors, both at the surface power supply and within the subsea equipment. Relevant parameters include insulation resistance, voltage and current monitoring. These measured parameters are fed into a model to determine the expected behaviour and interaction of the variables, using both historical data and a physical model. The output may thus predict and flag abnormal degradation of the system behaviour to provide early warning of likely faults.

Using a specific example, the health of the umbilical electrical conductors may be assessed using the following parameters measured over a period of time:
   surface LIM reading;
   surface input voltage;
   surface input current;
   subsea input voltage;
   subsea input current; and
   subsea LIM (if available).

The expected, theoretical resistance is calculated as:

$$R=(V/I)-\Delta r$$

where
   R=expected resistance
   V=voltage
   I=current
   $\Delta r$=degradation in resistance over time By monitoring the above parameters using their expected relationship, it is possible to determine the expected electrical behaviour of the umbilical over time and so identify when abnormal behaviour occurs. This method is also applicable for monitoring the entire electrical distribution system, including the main umbilical, any in-field umbilicals, electrical flying leads and connectors.

Figure 2:
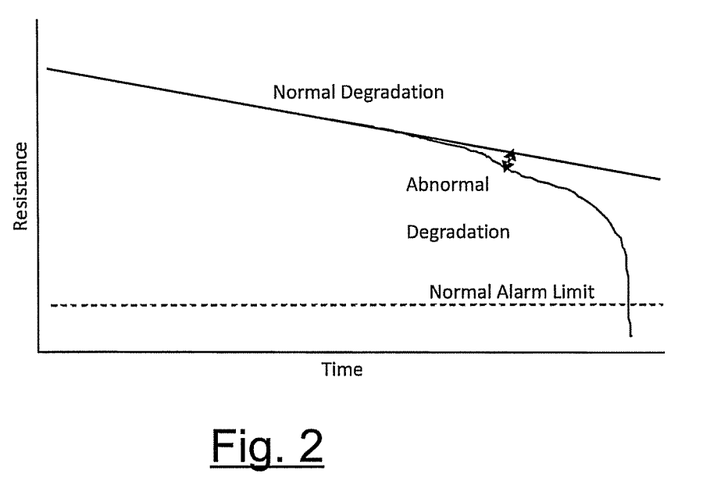
FIG. 2 provides a graphical representation of the degradation experienced by an exemplary subsea apparatus.

FIG. 2 shows a graph which illustrates the technique and demonstrates its advantage of early detection of a problem relative to the existing reliance on an alarm limit.

Hydraulic Fluid Leakage

Hydraulic fluid is used to operate various valves subsea. The fluid is pressurised at the surface (shore or platform/vessel) then transported through an umbilical 5 to the subsea control module 4. The subsea control module 4 distributes this fluid using electrically actuated directional control valves (DCVs) 19 (see FIG. 3). Pressure transducers (e.g. 18, 21, see FIG. 3) and flow meters (e.g. 17, see FIG. 3) are distributed within the control system to confirm the actuation of various valves. After use, the hydraulic fluid may be vented to sea (open loop) or returned to the shore (closed loop). The control system is generally set to a fail-safe position, so in the event that hydraulic pressure is lost, the well will be shut down.

Leaks of hydraulic fluid cause the following problems:
   environmental concerns;
   substantial costs;
   eventual loss of control if pressure cannot be maintained; and
   slower actuation times for valves (which can be a safety issue especially in emergency shutdown routines).

Current practices range from doing nothing until a failure occurs (inability to operate a valve or obvious increase in fluid consumption) to monitoring the consumption of hydraulic fluid at the topside facility. If there is a significant increase in the amount of fluid added to the system then manual investigation may follow. Gradual increases in consumption can go unnoticed. Generally, no account is made for activity (operation of valves) or individual pressure or flow meter readings until a failure has occurred.

A method in accordance with the present invention may automatically detects leaks based on some or all of:
   activation of valves;
   the known amount of fluid used to operate a valve, i.e. the actuator volume;
   flow of hydraulic fluid within the facility, for example:
      the amount of fluid moving through subsea flow meters;
      the amount of fluid calculated by monitoring pump status (e.g. using known volume per pump revolution and known number of revolutions);
      the amount of fluid leaving the hydraulic power unit at the surface, measured by a flow meter or from the hydraulic fluid reservoir level; and
   hydraulic fluid pressures measured at one or more points within the subsea control system.

By monitoring the above parameters, it is possible to determine the amount of hydraulic fluid that should be used and also the actual amount being used. If more fluid is being used than the theoretical requirement, then a leak can be presumed to be present. The magnitude of the leak can also be determined. Further analysis of the parameters above can also indicate a likely location of the leak.

Figure 3:
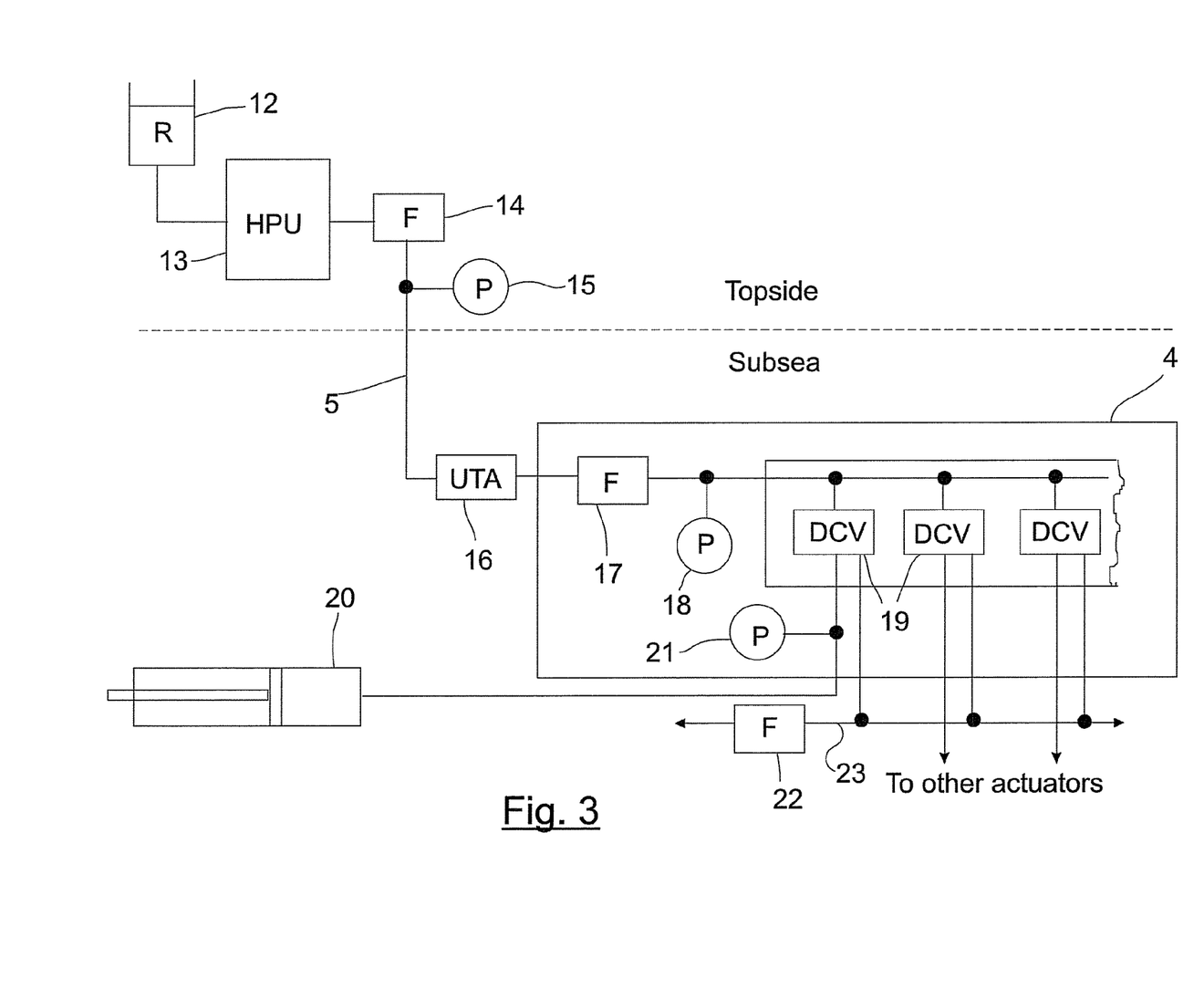
FIG. 3 schematically shows a typical well control hydraulic system.

FIG. 3 illustrates diagrammatically a simplified well control hydraulic system, which for clarity shows only one well tree and no associated distribution manifolds. Hydraulic fluid in a reservoir 12 feeds a hydraulic power unit (pump) 13 with the pump's output flow measured by a flow meter 14. All these components are mounted typically on a well control platform topside (i.e. at the surface). The output from the flow meter 14 feeds a well head tree via an umbilical 5, the umbilical's input hydraulic pressure being measured by a pressure transducer 15. The umbilical 5 connects, via an umbilical termination assembly 16, to a subsea control module 4. This houses a flow-meter 17, a subsea control module input pressure transducer 18 and a plurality of directional control valves (DCVs) 19 which operate well control valve actuators. Only three DCVs 19 and one actuator 20 are shown for simplicity. The pressure of the output of each DCV 19 is measured by a pressure transducer 21 (only one shown for clarity).

The flow meters shown in FIG. 3 may not always be present. If they are not present, then the flow rate or volume could be calculated using e.g. pressure drops, pump revolutions or by any other means available.

Fault determination could be assessed either statically or dynamically.
   A static approach would not take into account transience in the system; it would use volumes (calculated or measured) over a pre-determined time period. The system would then use basic logic to look for any missing, or unexpectedly gained, volume
   A dynamic approach would look at the flow rates, and compare these using similar basic logic to search for lost or gained fluid.

The static approach may be more applicable for the analysis of the control system, as generally such fluid is used only occasionally. For chemical injection or produced fluids the dynamic approach may be more appropriate as the flows are relatively constant.

Fluid volumes or flow rates may be calculated from:
   the change of level of surface of the reservoir 12—($V_1$);
   the physical flow meter 14 at the surface—($V_2$);

the physical flow meter 17 at the SCM 4—($V_3$);
a calculated flow across the or each DCV 19, using pressure sensors 18 and 21, and the known restriction of the DCV and known fluid properties ($V_4$);
physical flow meter 22 on a discharge/return line 23 ($V_5$); and
any physical flow meters that may be present on each control line.

Output from a flow meter may be converted into a volume as would be used for the static approach by integration over time, while conversely volume outputs, for example as would be measured directly from the change of level of surface of the reservoir, may be converted into a flow rate for use with the dynamic approach by measuring with respect to time.

An expected amount of fluid used ($V_6$) is derived from the known volume required to move an actuator 21 through its full stroke—or partial stroke in the case where the position is measured or calculated separately.

The presence and location of a leak for the simple single well tree configuration shown in FIG. 3 can be determined using logic such as that set out below:

If $V_1 > V_2$ and $V_2 = V_3 = V_4 = V_5$ then there is a leak in the surface (topside) system.

If $V_1 = V_2 > V_3$ and $V_3 = V_4 = V_5$ then there is a leak in the umbilical system.

If $V_1 = V_2 = V_3 > V_4$ and $V_4 = V_5$ then there is a leak in the SCM 4 before the DCVs 19 (i.e. on the surface side).

If the calculated volumes $V_4$ is greater than its corresponding expected volume $V_5$, then there is a leak after the DCV 20 (i.e. on the well side).

The above logic can be extended to the more typical situation where a plurality ("n") of well trees (e.g. numbered 1-n in the following analysis), with respective associated SCMs, are present in the field, each well tree being connected to the common umbilical 5 via a distribution manifold. In the following logic, $V_{4(n)}$ represents the equivalent value $V_4$ for tree "n" and $V_{5(n)}$ represents the equivalent value $V_5$ for tree "n":

If $V_1 > V_2$ and $V_2 = V_3 = (V_{4(1)} + V_{4(2)} + \ldots V_{4(n)}) = (V_{5(1)} + V_{5(2)} + \ldots V_{5(n)})$
then there is a leak in the surface (topside) system.

If $V_1 = V_2 > V_3$ and $V_3 = (V_{4(1)} + V_{4(2)} + \ldots V_{4(n)}) = (V_{5(1)} + V_{5(2)} + \ldots V_{5(n)})$ then there is a leak in the umbilical system.

If $V_1 = V_2 = V_3 > (V_{4(1)} + V_{4(2)} + \ldots V_{4(n)})$ and $(V_{4(1)} + V_{4(2)} + \ldots V_{4(n)}) = (V_{5(1)} + V_{5(2)} + \ldots V_{5(n)})$ then there is a leak in an SCM 4 before its DCVs 19 (i.e. on the surface side).

If one of the calculated volumes $(V_{4(1)}, V_{4(2)}, \ldots V_{4(n)})$ is greater than its corresponding expected volume $(V_{5(1)}, V_{5(2)}, \ldots V_{5(n)})$, then there is a leak after the DCV 20 (i.e. on the well side) at that well tree.

Pressure gauges can also be used to determine if there are any leaks without the operation of valves. For example:
if $P_1 > P_3 + \rho g h$ (where $P_1$ is the pressure measured by pressure transducer 15, $P_3$ is the pressure measured by pressure transducer 18, $\rho$ is the density of the fluid, g is the gravitational acceleration and h is the difference in height between the two transducers $P_1$ and $P_3$) with no valves being operated (or accumulators filled) then there is likely to be a leak. Here the $\rho g h$ term is used to compensate for the difference in elevation between transducers 15 and 18.

Applications are not limited to the producing well example used here, but could include any part of a subsea control system where hydraulic fluid is used to move actuators and/or valves.

Should any of the individual gauges fail once the relationships between the various measurements have been established, then a virtual measurement can be created using the output of the remaining functioning gauges. This could be particularly useful in the event of a chemical injection flow meter failure.

The same logic can be applied to any fluid system, for example chemical injection or produced fluid.

Wear or Erosion within Choke Valves

A choke valve is used to control the flow from a producing well or control the rate of injection of fluid into an injection well (or chemicals into a flow line). Production fluid flow is measured using physical flow-meters capable of measuring multi-phase flow.

The present invention enables the choke position to be determined, and compared to a measured position, from the flow rate through the choke. To this end a physical flow meter may be used to measure the flow directly. However this is relatively expensive, and so the flow may alternatively be determined by using the pressure and temperature measurements at the inlet and outlet of the choke, and the choke's known flow rate and pressure drop characteristics.

Typical problems that can arise with chokes include erosion and inaccuracy of position setting. Choke valves by their nature erode, resulting in a reduced functionality. Operators setting a choke to achieve a specific restriction and thus pressure flow characteristic may see a different characteristic because of this erosion.

The position of the choke flow controlling sleeve can be monitored using a linear potentiometer (LVDT), other direct measurement device or, for a stepper-type choke, by counting the number of pulses sent to the stepper drive, whilst other methods may be used for rotary actuators. All of these methods are subject to inaccuracies (e.g. drift on a sensor, failure to count 'steps', etc) which can result in a different position being achieved to the one desired by the operator.

These types of fault may be analysed by using either the physical flow meter measured flow rate and/or a calculated flow rate to determine if:
the choke has eroded; and/or
the choke position indicator is wrong.

The physical flow meter gives a flow rate and volume fraction of component fluids such as gas, water or oil etc. Using this flow rate and pressure sensors on each side of the choke, it is possible to calculate the restriction of the choke, by comparing determined flow rates with expected flow rates for various choke positions. Any difference between the two may be due to erosion (if the actual restriction is less than desired restriction), plugging, or false position indication.

A false position indication can be isolated from erosion/plugging by moving the choke to an extreme position, either open or closed. However, this may not be desirable or possible. An alternative method is to move the choke around the position at which it has been held for an extended period. Due to the nature of chokes only the part 'open' to flow will erode and by moving the plunger around this position a characteristic deflection will be apparent—isolating erosion from a false position indication. In more detail, suppose the choke is kept at a constant position $x_1$ for an extended period. The open part of the choke, i.e. that exposed to flow, may erode or plug, leading to a difference between the expected throughflow and the actual throughflow. Now, for all choke positions which are more open (e.g. $x > x_1$), the difference $\Delta$ between expected and actual flow will be substantially constant with x, since erosion/plugging cannot affect the closed part of the choke (since it is not exposed to the flow). However, for choke positions which are more closed (e.g. $x < x_1$), the difference $\Delta$ will vary as a function of x.

By comparing determined and expected flow rates therefore, it is possible to make inferences as to the functioning of the choke. By determining Δ across a range of x, and the change in Δ across this range, it is possible to determine the amount of plugging/erosion, and localise this to specific values of x. If on the other hand Δ is determined to be constant across the full range of x (i.e. choke 100% closed to 100% open), then this indicates that the choke position measurements are incorrect, i.e. there is false position indication, unless that is the choke has been 100% open for a prolonged period leading to plugging/erosion over the extent of the choke.

Wear within Valve Actuators

FIG. 3 shows a typical hydraulic circuit including a number of directional control valves (DCVs) 19. These are valves, operated by electrical solenoids, which control hydraulic fluid flow to a vale actuator 20. A subsea control module 4, mounted on the tree, houses the or each DCV 19. The module 4 also contains pressure sensors 18 and 21, that measure the pressure of driving fluid on the supply and driven sides respectively of the or each DCV (only one sensor 21 is shown in FIG. 3 for simplicity, it will be understood by those skilled in the art that each DCV 19 may have such an associated sensor 21 on its driven side). From these measurements the volume of fluid consumed by an actuation of the DCV may be calculated, since the pressure/flow characteristics of the DCV 19 are known. Often the volume can also be measured directly on the supply side by a flow meter 17 if present, which, as shown, may also be located in the module 4. Often it is not possible to directly measure the position of a subsea actuator, and instead it is necessary to rely on either a crude pressure indication or a calculated volume. A software application has been developed, "VFVP" (valve footprint verification program) to monitor the volume of hydraulic fluid moved to determine if the actuator has fully stroked.

Subsea actuators can fail which can lead to the inability to operate a valve, which in turn can cause significant control and safety issues. The failures can be gradual in nature, such as deterioration of a seal, repeated sticking and becoming free before finally becoming permanently stuck, which in turn requires a gradual increase in pressure required to activate.

In known systems, no record is kept of the number of actuations.

A method in accordance with the present invention may:
utilise the correlation between the number of actuations and failure. For example, a sliding seal can be estimated to last a certain distance moved under certain conditions, from data readily available from seal manufacturers. Therefore, by monitoring the number of actuations and equating this to the seal distance moved, the percentage of remaining life can be estimated; and monitor the pressure profile when a valve is actuated by comparing this profile to a baseline captured at a known healthy point in time, such as at installation. Subsequent measurements are assessed to look for trends such as differences in volume, time or pressure to activate, and variations in rates of motion during the activation, taking into account process conditions such as the pressure against which the valve is acting.

The time taken to fully stroke an actuator, i.e. activate it, is a function of the hydraulic fluid supply pressure, accumulator volume, hydrostatic pressure, spring constant of the actuator and frictional losses, such as fluid restrictions or actuator/valve friction. All of these are either known before installation or measured during use, except the frictional losses. Therefore, a relationship between the stroke time and other measurements can be determined for each actuator. Any deviations from this relationship therefore signifies a change in the frictional losses, and thus impending failure. This could be due to fluid blockage or mechanical friction changes (seal failure, mechanical interference, etc.). Likewise, the same method can be used to monitor the time taken for the actuator to stroke closed, usually forced by a spring within the actuator.

In a preferred embodiment, the volume of hydraulic fluid necessary to move the actuator is monitored and trended. A change in the volume of fluid used indicates an impending failure. An increase in the fluid volume necessary indicates leaks (potentially of the seals) and a decrease in the fluid volume indicates an incomplete stroke or build up of debris.

The volume of fluid expelled when de-activating the valve may be recorded and trended in the same way. A decrease in the volume expelled indicates either that the actuator was not fully activated, is not fully de-activated, or that there is a leak before the flow meter. These causes may be differentiated by comparing the expelled fluid volume with the volume of fluid necessary for activation.

In addition, each valve will have a general 'signature' pressure/flow profile. This can be obtained during installation, testing or at any point before failure. Deviation from this signature during following operations can be monitored and trended to alert the operator to potential impending failures.

In particular the above signature profiling method can be applied to a surface-controlled subsea safety valve (not shown). This is an important safety valve, operated typically by a high pressure hydraulic fluid supply. It is used as a safety barrier, during well tests and work-overs.

Failure of Controlling Electronics

The control electronics for a subsea well are typically located in a subsea electronics module (SEM) 3 (shown in FIG. 1 but omitted from FIG. 3 for clarity) which is typically located within an SCM 4. The SEM 3 is critical to the control system. Current safety methods involve simply waiting for a failure, switching to back-up, and replacing when possible—hoping the backup does not fail. There is currently no active monitoring for failure prediction. The electrical operation of the well is also dependent on subsea connectors which are complex wet-mate items and are often the point at which the electrical, hydraulic or chemical distribution fails. Problems with the connectors can often be solved by re-making them, which is relatively simple, but requires the mobilisation of a remote-operated vehicle.

An exemplary method in accordance with the present invention may:
a) monitor 'housekeeping' data for health deteriorating factors such as temperature, pressure and humidity and also monitor for signs of deterioration such as fluctuations of current drawn, signal levels, voltages etc.;
b) determine a life for the SEM or individual boards and/or components, based on the above factors through accelerated life testing; and
c) calculate a remaining useful life for the SEM, to allow replacement before failure; and use a combination of monitoring of electrical (LIM), hydraulic fluid, and chemical injection flow-meters or leak detectors to determine a general health of the subsea connectors.

The above-described embodiments are exemplary only, and those skilled in the art will readily envisage alternatives within the scope of the claims.

Another exemplary method may include monitoring the condition of apparatus located at an underwater facility, comprising the steps of:
a) sensing at least one parameter associated with the apparatus,
b) providing a model of expected behaviour of said at least one parameter, c) comparing said sensed parameter with said model, and d) assessing the condition of the apparatus based upon said comparison.

The method wherein step c) comprises comparing the number of actuations to known life spans of actuator components. The method further comprising the step of determining the time taken to fully stroke the actuator. The method further comprising the step of using the determined time taken to calculate friction within the actuator. The method can be used for detection and/or monitoring of failure of electronics components for controlling apparatus at the facility. The method wherein step a) includes sensing at least one of: temperature, pressure, humidity, current drawn by a component, signal levels and voltage at least one location in the facility. The method further comprising the step of determining the health of an underwater electrical connector. The health of the connector can be determined by obtaining at least one of: LIM measurements, hydraulic fluid flow determinations and chemical injection flow determinations.

Also disclosed is a condition monitoring means for monitoring a component of an underwater facility, comprising: a sensor associated with the component for sensing a parameter and outputting a signal indicative of said parameter; an expert system arranged to receive each said output signal, the expert system including a model of expected behaviour of said parameter. The expert system can include a historical database. The component can include an umbilical and an associated umbilical termination assembly, and the condition monitoring means can be adapted to monitor the condition of electrical conductors of the component. The condition monitoring means further comprising sensors for sensing one or more of: a surface LIM reading, a surface input voltage, a surface input current, an underwater input voltage, an underwater input current and an underwater LIM. The condition monitoring means further comprising means for collating any alarms associated with the parameter. The component can include a hydraulic fluid system, and the condition monitoring means is adapted to detect and/or monitor hydraulic fluid leakage from the system. The condition monitoring means further comprising sensors for sensing at least one of: activation of a valve at the facility, a flow of hydraulic fluid within the facility, an amount of hydraulic fluid leaving a hydraulic reservoir located at the surface and a hydraulic fluid pressure at one or more points within a control system of the facility. The component can include a choke valve, and the condition monitoring means is adapted to detect and/or monitor wear or erosion within the choke valve. The condition monitoring means further comprising means for determining a flow rate through the choke valve. The flow rate determining means can have a flow meter in the proximity of the choke valve to directly determine flow therethrough. The flow rate determining means can be sensors for measuring pressure and temperature characteristics of fluid at the inlet and outlet of the choke. The component can have a valve actuator and the condition monitoring means is adapted to detect and/or monitor wear within valve actuator. The condition monitoring means can further have means for determining the volume of fluid consumed by an actuation of the valve. The volume determining means may be a hydraulic fluid pressure sensor located at each side of the valve. The volume determining means can be a volume sensor. The condition monitoring means may further comprise means for monitoring the number of actuations performed. The expert system can be adapted to compare the number of actuations to known life spans of actuator components. The condition monitoring means can also comprise means for determining the time taken to fully stroke the actuator. The condition monitoring means may further comprise means for calculating friction within the actuator using the determined time. The component can have electronics components for controlling apparatus at the facility, and the condition monitoring means is adapted to detect and/or monitor failure of the electronics components. Means for sensing at least one of: temperature, pressure, humidity, current drawn by a component, signal levels and voltage at least one location in the facility may be included. Means for determining the health of an underwater electrical connector can also be included. The means for determining the health of the connector can have sensors for obtaining at least one of: LIM measurements, hydraulic fluid flow determinations and chemical injection flow determinations.

What is claimed is:

1. A method for monitoring the condition of apparatus located at an underwater facility, comprising the steps of:
    a) sensing at least one parameter associated with the apparatus, the sensing including sensing a plurality of parameters,
    b) providing a model of expected behaviour of said plurality of parameters,
    c) comparing said sensed plurality of parameters with said model, and
    d) assessing the condition of the apparatus based upon said comparison,
    wherein each parameter, each alarm of any alarms associated with the parameters, or each parameter and each alarm is assigned a priority rating within the model.

2. A method according to claim 1, wherein steps b), c) and d) are carried out using an expert system.

3. A method according to claim 2, wherein the expert system comprises a historical database.

4. A method according to claim 2, including the step of providing the expert system with input from an external source, said input being used to enhance the model.

5. A method according to claim 1, wherein step a) includes collating any alarms associated with one or more of the plurality of parameters.

6. A method according to claim 1, wherein monitoring the condition of apparatus located at an underwater facility comprises umbilical electrical conductor condition monitoring.

7. A method according to claim 6, wherein step a) includes sensing at least one of: a surface LIM reading, a surface input voltage, a surface input current, an underwater input voltage, an underwater input current and an underwater LIM.

8. A method according to claim 1, wherein monitoring the condition of apparatus located at an underwater facility comprises one or more of the following: detecting hydraulic fluid leakage and monitoring of hydraulic fluid leakage.

9. A method according to claim 8, wherein step a) includes sensing at least one of: activation of a valve, flow of hydraulic fluid within the facility, an amount of hydraulic fluid leaving a hydraulic reservoir located at the surface and a hydraulic fluid pressure at one or more points within a control system of the facility.

10. A method according to claim 1, wherein monitoring the condition of apparatus located at an underwater facility comprises one or more of the following:
    detecting wear or erosion within a choke valve; and
    monitoring of wear or erosion within the choke valve.

11. A method according to claim 10, wherein the method further comprises determining a flow rate through the choke valve by performing one or more of the following:
    determining a flow rate through the choke valve;
    using a flow meter in the proximity of the choke valve to directly determine flow therethrough; and measuring pressure and temperature characteristics of fluid at the inlet and outlet of the choke valve.

12. A method according to claim 10, wherein monitoring the condition of apparatus located at an underwater facility further comprises; one or more of the following:
   detecting wear within a valve actuator; and
   monitoring of wear within the valve actuator.

13. A method according to claim 12, comprising the step of determining the volume of fluid consumed by an actuation of the valve, wherein the volume is determined by measuring hydraulic fluid pressure at each side of the valve.

14. A method according to claim 1, further comprising the step of monitoring a number of valve actuations performed.

15. A method for monitoring the condition of apparatus located at an underwater facility, the method comprising the steps of:
   sensing at least one parameter associated with the apparatus,
   providing a model of expected behaviour of said at least one parameter,
   comparing said sensed parameter with said model,
   assessing the condition of the apparatus based upon said comparison, and
   one or more of the following:
      detecting a failure of electronic components for controlling the apparatus at the facility; and
      monitoring of the failure of the electronic components for controlling the apparatus at the facility.

16. Condition monitoring means for monitoring a component of an underwater facility, comprising:
   a sensor associated with component for sensing a parameter and outputting a signal indicative of said parameter; and
   an expert system arranged to receive each said output signal, the expert system including a model of expected behaviour of said parameter, wherein the expert system includes a historical database.

17. Condition monitoring means according to claim 16, wherein the component comprises an umbilical and an associated umbilical termination assembly, and the condition monitoring means is adapted to monitor the condition of electrical conductors of the component.

18. Condition monitoring means according to claim 16, comprising means for collating any alarms associated with the parameter.

19. Condition monitoring means according to claim 16, wherein the component comprises a hydraulic fluid system, and wherein the condition monitoring means is adapted to perform one or more of the following: detecting hydraulic fluid leakage from the system, and monitoring hydraulic fluid leakage from the system.

20. Condition monitoring means according to claim 16, wherein the component comprises a choke valve, and wherein the condition monitoring means is adapted to perform one or more of the following: detecting wear or erosion within the choke valve, and monitoring wear or erosion within the choke valve.

21. Condition monitoring means according to claim 16, wherein the component comprises a valve actuator and the condition monitoring means is adapted to perform one or more of the following: detecting wear within the valve actuator and monitoring wear within the valve actuator.

22. Condition monitoring means according to claim 16, wherein the component comprises electronics components for controlling apparatus at the facility, and wherein the condition monitoring means is adapted to perform one or more of the following: detecting failure of the electronics components, and monitoring failure of the electronics components.

* * * * *